(12) United States Patent
Kent (10) Patent No.: US 9,665,890 B1
(45) Date of Patent: May 30, 2017

(54) DETERMINING LOOKBACK WINDOWS

(71) Applicant: Google Inc., Mountain View, CA (US)

(72) Inventor: James Kent, London (GB)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 13/683,092

(22) Filed: Nov. 21, 2012

(51) Int. Cl.
G06Q 30/00 (2012.01)
G06Q 30/02 (2012.01)

(52) U.S. Cl.
CPC .................................. G06Q 30/0272 (2013.01)

(58) Field of Classification Search
CPC combination set(s) only.
See application file for complete search history.

(56) References Cited

U.S. PATENT DOCUMENTS

| | | | |
|---|---|---|---|
| 7,831,472 B2 | 11/2010 | Yufik | |
| 7,945,660 B2 | 5/2011 | Goyal et al. | |
| 2003/0046161 A1* | 3/2003 | Kamangar | G06Q 30/02 705/14.6 |
| 2004/0024578 A1* | 2/2004 | Szymanski | G06F 17/5009 703/17 |
| 2004/0107137 A1* | 6/2004 | Skinner | G06Q 30/02 705/14.46 |
| 2005/0144065 A1* | 6/2005 | Calabria | G06Q 30/02 705/14.68 |
| 2006/0026060 A1 | 2/2006 | Collins | |
| 2007/0022003 A1* | 1/2007 | Chao | G06Q 30/02 705/14.46 |
| 2008/0154708 A1* | 6/2008 | Allan | G06Q 30/02 705/1.1 |
| 2009/0216647 A1* | 8/2009 | Kamangar | G06Q 30/02 705/14.36 |
| 2010/0005000 A1* | 1/2010 | McKinzie | G06Q 30/0277 705/14.73 |
| 2010/0318400 A1* | 12/2010 | Geffen | G06Q 30/016 705/304 |
| 2011/0015996 A1* | 1/2011 | Kassoway | G06F 17/30882 705/14.49 |
| 2011/0125594 A1* | 5/2011 | Brown | G06Q 30/02 705/14.73 |
| 2011/0191714 A1 | 8/2011 | Ting et al. | |
| 2011/0231242 A1 | 9/2011 | Dilling et al. | |

(Continued)

Primary Examiner — Matthew T Sittner
(74) Attorney, Agent, or Firm — Fish & Richardson P.C.

(57) ABSTRACT

Methods, systems, and apparatus, including computer programs encoded on a computer-readable storage medium, for determining a suggested time for linking interactions with events. A method includes: identifying data for a content provider that includes events and data related to presentation of and interactions of users with content; identifying a model for linking interactions with events that includes criteria for use in evaluating an interaction to determine when to link an interaction to a given event; for each event, determining a number of interactions that occurred in each of multiple time periods prior to a given event; performing a mathematical operation on the number of interactions in each time period producing a result; and determining a suggested time for linking interactions and events based on the result for each time period, the suggested time representing an amount of time before an event in which interactions are appropriately linked to the event.

13 Claims, 5 Drawing Sheets

(56) References Cited

U.S. PATENT DOCUMENTS

| | | | |
|---|---|---|---|
| 2011/0307320 A1* | 12/2011 | Tangney | G06Q 30/0242 705/14.41 |
| 2011/0307321 A1* | 12/2011 | Tangney | G06Q 30/0242 705/14.41 |
| 2012/0303447 A1* | 11/2012 | Hughes | G06Q 30/0255 705/14.46 |
| 2013/0030908 A1* | 1/2013 | Gessner | G06Q 30/0277 705/14.45 |
| 2013/0085837 A1* | 4/2013 | Blume | G06Q 30/0241 705/14.41 |
| 2013/0138503 A1* | 5/2013 | Brown | G06Q 30/0246 705/14.45 |
| 2013/0191208 A1* | 7/2013 | Chourey | G06Q 30/0201 705/14.45 |
| 2013/0197993 A1* | 8/2013 | Gao | G06Q 30/0275 705/14.45 |
| 2014/0067530 A1* | 3/2014 | Pluche | G06Q 30/0267 705/14.53 |

* cited by examiner

Determine one or more second models for linking interactions with events, the one or more second models being different from a first model, each of the one or more second models including one or more criteria for use in evaluating an interaction to determine when an interaction should be linked to a given event for a respective model
402

Evaluate the one or more second models    404

For each event, determine for each model and using data identified for a content provider, a number of interactions that occurred in each of the plurality of time periods prior to a time of event for a given event    406

Perform a mathematical operation on the number of interactions in each time period for each model, producing a result for each model for each time period    408

410
Determine a suggested time for event linking for the content provider, based at least in part on the result in each time period for each model

DETERMINING LOOKBACK WINDOWS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for determining a suggested lookback window. The method comprises: identifying data for a content provider, the data including data related to presentation of content and interactions of users with content presented by the content provider, the data further including events; identifying a first model for linking interactions with events, the first model including one or more criteria for use in evaluating an interaction to determine when an interaction should be linked to a given event; and evaluating, by one or more processors, the first model including: for each event, determining for the first model and using the data, a number of interactions that occurred in each of a plurality of time periods prior to a time of event for a given event; performing a mathematical operation on the number of interactions in each time period for the first model producing a result; and determining a suggested time for the content provider for linking interactions and events based at least in part on the result for each time period, wherein the suggested time represents an amount of time before an event in which interactions are appropriately linked to the event.

In general, another aspect of the subject matter described in this specification can be implemented in computer program products. A computer program product is tangibly embodied in a computer-readable storage device and comprises instructions that, when executed by a processor, cause the processor to: identify data for a content provider, the data including data related to presentation of content and interactions of users with content presented by the content provider, the data further including events; identify a first model for linking interactions with events, the first model including one or more criteria for use in evaluating an interaction to determine when an interaction should be linked to a given event; and evaluate the first model including: for each event, determining for the first model and using the data, a number of interactions that occurred in each of a plurality of time periods prior to a time of event for a given event; performing a mathematical operation on the number of interactions in each time period for the first model producing a result; and determining a suggested time for the content provider for linking interactions and events based at least in part on the result for each time period, wherein the suggested time represents an amount of time before an event in which interactions are appropriately linked to the event.

In general, another aspect of the subject matter described in this specification can be implemented in systems. A system includes a content management system, an interaction data store, and a model repository. The content management system is configured to: identify data from the interaction data store for a content provider, the data including data related to presentation of content and interactions of users with content presented by the content provider, the data further including events; identify a first model from the model repository for linking interactions with events, the first model including one or more criteria for use in evaluating an interaction to determine when an interaction should be linked to a given event; and evaluate the first model including: for each event, determining for the first model and using the data, a number of interactions that occurred in each of a plurality of time periods prior to a time of event for a given event; performing a mathematical operation on the number of interactions in each time period for the first model producing a result; and determining a suggested time for the content provider for linking interactions and events based at least in part on the result for each time period, wherein the suggested time represents an amount of time before an event in which interactions are appropriately linked to the event.

These and other implementations can each optionally include one or more of the following features. The suggested time can be presented to the content provider. The suggested time can be used when linking interactions with events. One or more second models can be determined for linking interactions with events. The one or more second models can be different from the first model. Each of the one or more second models can include one or more criteria for use in evaluating an interaction to determine when an interaction should be linked to a given event for a respective model. The one or more second models can be evaluated. The evaluating of the one or more second models can include, for each event, determining for each model and using the data, a number of interactions that occurred in each of the plurality of time periods prior to a time of event for a given event. The evaluating of the one or more second models can include performing a mathematical operation on the number of interactions in each time period for each model producing a result for each model for each time period. The evaluating of the one or more second models can include determining a suggested time for event linking for the content provider based at least in part on the result in each time period for each model. Determining a suggested time can include picking a time window associated with one model of the first and one or more second models. Determining a suggested time can include selecting a suggested time window as an aggregate of the suggested time windows for at least two models of the first and one or more second models. Determining a suggested time can include selecting a time window associated with the first or one or more of the second models that is slowest to converge. A sensitivity to using the suggested time can be identified and a correction factor can be applied to the suggested time based at least in part on the sensitivity. The suggested time can be adjusted based at least in part on cookie deletion data, wherein the cookie deletion data indicates an amount of time a cookie is likely to be valid, and wherein cookies are used to assist in accumulating the data. The criteria can include criteria that define different types of sponsored content or different mediums for presentation of the sponsored content. The suggested time can be attributable to the given criteria. The data can include plural events and evaluating the first model can include evaluating the first model using less than all of the plural events in the data. The suggested time can be compared to data determined by an analytics system to verify the first model. A current lookback window associated with the content provider can be identified. The current lookback window can be compared to the suggested time. A summary of a comparison of a number of interactions or dollar amount that is discounted based on the comparison can be provided to the content provider. The events can be conversion events. The mathematical operation can be an accumulation and the result can be a total number in a respective time period. Linking can include attributing the interaction to the event. The time periods can be non-overlapping. The suggested time can define a time window for linking interactions with events. Linking can include, for a given event, crediting an entity associated with an interaction that occurred in a suggested time prior to an occurrence of the given event.

Particular implementations may realize none, one or more of the following advantages. A content provider can be provided with a suggested time window for linking interactions with events. A content provider can be provided with a determined lookback window which indicates an average conversion path length for the content provider.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Data for a content provider can be identified, where the data includes events and data related to presentation of and interactions by users with content presented by the content provider. A model for linking interactions with events can be developed, where the model includes one or more criteria for use in evaluating an interaction to determine when an interaction should be linked to a given event. The model can be evaluated to determine a suggested time (e.g., a lookback window) for the content provider for linking interactions and events. The suggested time can represent, for example, an amount of time before an event in which interactions are appropriately linked to the event.

Figure 1:
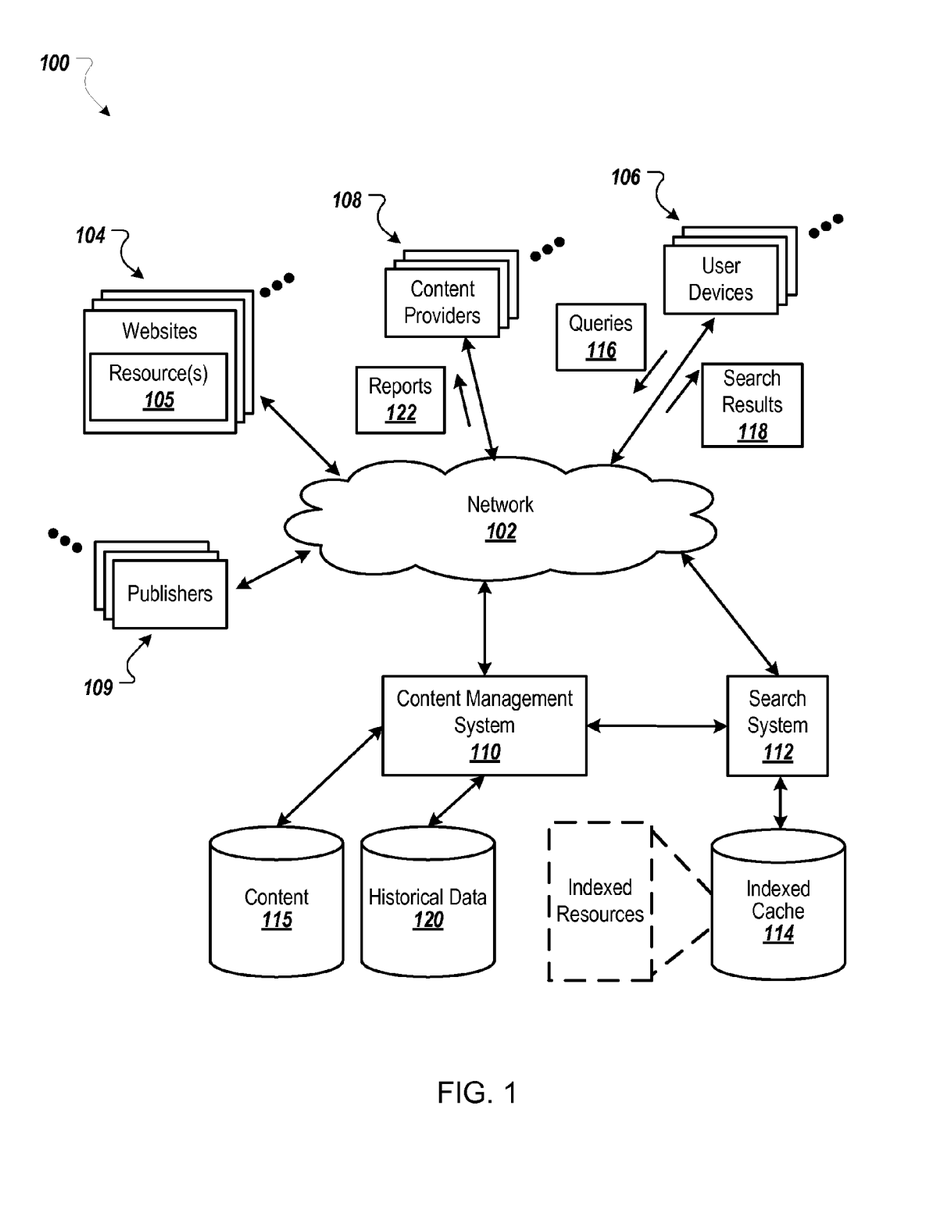
FIG. 1 is a block diagram of an example environment for providing content to a user.

FIG. 1 is a block diagram of an example environment 100 for providing content to a user. The example environment 100 includes a network 102 such as a local area network (LAN), wide area network (WAN), the Internet, or a combination thereof. The network 102 connects websites 104, user devices 106, content providers 108, publishers 109, and a content management system 110. The example environment 100 may include many thousands of websites 104, user devices 106, content providers 108, and publishers 109.

A website 104 includes one or more resources 105 associated with a domain name and hosted by one or more servers. An example website 104 is a collection of webpages formatted in hypertext markup language (HTML) that can contain text, images, multimedia content, and programming elements, e.g., scripts. Each website 104 is maintained by, for example, a publisher 109, e.g., an entity that controls, manages and/or owns the website 104.

A resource 105 is any data that can be provided over the network 102. A resource 105 is identified by a resource address that is associated with the resource 105. Resources 105 include HTML pages, word processing documents, and portable document format (PDF) documents, images, video, and feed sources, to name only a few examples. The resources 105 can include content, e.g., words, phrases, images and sounds that may include embedded information (such as meta-information in hyperlinks) and/or embedded instructions (such as JavaScript scripts).

To facilitate searching of resources 105, the environment 100 can include a search system 112 that identifies the resources 105 by crawling and indexing the resources 105 provided by the publishers 109 on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources 105 over the network 102. Example user devices 106 include personal computers, mobile communication devices, tablet devices, and other devices that can send and receive data over the network 102. A user device 106 typically includes a user application, such as a web browser, to facilitate the sending and receiving of data over the network 102 and the presentation of content to a user.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can access, for example, the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots. An example slot is an advertisement slot.

A search result 118 or a resource 105 can be sent responsive to a request received from a user device 106. The search result 118 or resource 105 can be sent with a request for the web browser of the user device 106 to set a Hypertext Transfer Protocol (HTTP) cookie. A cookie can represent, for example, a particular user device 106 and/or a particular web browser. For example, the search system 112 can include a server that replies to a search query 116 by sending a search result 118 in an HTTP response. Such an HTTP response can include instructions (e.g., a set cookie instruction) requesting the browser to store a cookie for the site hosted by the server.

In some implementations, each cookie can include content which specifies an initialization time that indicates a time at which the cookie was initially set on the particular user device 106. If the browser supports cookies and cookies are enabled, subsequent page requests to the same server can include the cookie for that server. Because HTTP is a stateless protocol, the use of cookies can allow an external service, such as the search system 112 or other system, to track particular actions and status of a user over multiple sessions. The cookie can store a variety of data, including a unique or semi-unique identifier. The identifier can be anonymized so that the privacy of users is protected. For example, in some implementations, semi-unique identifiers are associated with users, but actual identifying information of the users is not stored in a cookie. Additionally, any identified user interactions can be generalized rather than associated with a particular user. Encryption and obfuscation techniques can also be used to protect the privacy of users.

When a resource 105 or search results 118 are requested by a user device 106, the content management system 110 may receive a request for content to be provided with the resource 105 or search results 118. The request for content can include characteristics of one or more slots that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116.

Based, for example, on data included in the request for content, the content management system 110 can select content items that are eligible to be provided in response to the request, such as content items having characteristics matching the characteristics of a given slot. As another example, content items having selection keywords that match the resource keywords or the search query 116 may be selected as eligible content items by the content management system 110. Content items may be selected, for example from a content repository 115. One or more selected content items can be provided to the user device 106 in association with providing an associated resource 105 or search results 118. In some implementations, the content management system 110 can select content items based at least in part on results of an auction. For example, for the eligible content items, the content management system 110 can receive bids from content providers 108 and allocate the slots, based at least in part on the received bids (e.g., based on the highest bidders at the conclusion of the auction).

In some implementations, some content providers 108 prefer that the number of impressions allocated to their content and the price paid for the number of impressions be more predictable than the predictability provided by an auction. A content provider 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content provider 108 over a specified period (e.g., one week). In turn, the content provider 108, publisher 109, or both parties can provide data to the content management system 110 that enables the content management system 110 to facilitate satisfaction of the agreement.

For example, the content provider 108 can upload a content item and authorize the content management system 110 to provide the content item in response to requests for content corresponding to the website 104 of the publisher 109. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

User interaction data representing user interactions with presented content items can be stored in a historical data store 120. User interaction data can be associated with unique identifiers (e.g., cookies) that each represent a corresponding user device 106 with which a given user interaction was performed. For example, when a content item is presented to a user, data can be stored in the historical data store 120 representing the content item impression. In some implementations, the data is stored in response to a request for the content item that is presented. For example, a request for content can include data identifying a particular cookie, such that data identifying the cookie can be stored in association with data that identifies the content item(s) that are presented in response to the request. Similarly, when a user selects (i.e., clicks) a presented content item, data can be stored in the historical data store 120 representing the selection of the content item. The historical data store 120 can store references to content items and data representing conditions under which each content item was selected for presentation to a user. For example, the historical data store 120 can store selection keywords, bids, and other criteria with which eligible content items are selected for presentation.

The historical data store 120 can include information related to conversions. A conversion occurs when a user performs a specified action. When a conversion is detected for a content provider, conversion data representing the conversion can be stored in the historical data store 120. Such conversion data can be stored in association with one or more cookies for the user device 106 that was used to perform the user interaction.

What constitutes a conversion may vary from case to case and can be determined in a variety of ways. For example, a conversion may occur when a user clicks on a content item, is referred to a web page, and then consummates a purchase before leaving that web page. Actions that constitute a conversion can be specified by each content provider 108 on a content provider by content provider basis. For example, each content provider 108 can select, as a conversion, one or more measurable/observable user actions such as, for example, downloading a white paper, navigating to at least a given depth of a website, viewing at least a certain number of web pages, spending at least a predetermined amount of time on a website or web page, or registering on a website. Other actions that constitute a conversion can also be used. A conversion can be defined to occur upon the occurrence of a final action that is used to define the conversion. For example, if a user visiting five web pages defines a conversion, the conversion occurs upon the user's request for the fifth web page, and the four page views that occurred prior to the request for the fifth web page are considered to have occurred prior to the conversion.

The historical data store 120 can include data that represents conversion cycles. A conversion cycle can be defined as a period that begins when a user is presented a content item and ends at a time at which the user takes action (e.g., that constitutes a conversion). A conversion cycle can be measured and/or constrained by time or actions and can span multiple user sessions. User sessions can be defined as sets of user interactions that are grouped together for analysis. Each user session includes data representing user interactions that were performed by a particular user and within a session window (i.e., a specified period). The session window can be, for example, a specified period of time (e.g., one hour, one day, or one month) or can be delineated using specified actions. For example, a user search session can include user search queries and subsequent actions that occur over a one hour period and/or occur prior to a session ending event (e.g., closing of a search browser).

A content provider 108 can be provided various reports 122. For example, a content provider can be provided a campaign performance report that provides a number of impressions (i.e., presentations), interactions (e.g., selections (i.e., clicks)), and conversions that have been identified for the content items that are provided by the content provider 108. A campaign performance report can also provide a total cost, a cost-per-click, and other cost measures for a content item over a specified period of time. A user interaction report can measure user interactions with content that is distributed to users for the content provider 108. In some implementations, the reports 122 that are provided to a particular content provider 108 specify performance measures measuring user interactions with content that occur prior to a conversion.

As described in more detail below, the content management system 110 can determine a suggested time for a content provider 108 for linking interactions and events (e.g., conversion events) based on data in the historical data store 120. The suggested time can be, for example, a lookback window which defines a time window for linking interactions with events. The suggested time can be included in one or more of the reports 122 that are provided to the content provider 108. As another example, the content management system 110 can automatically configure one or more campaigns associated with the content provider 108 to use the determined lookback window.

Figure 2:
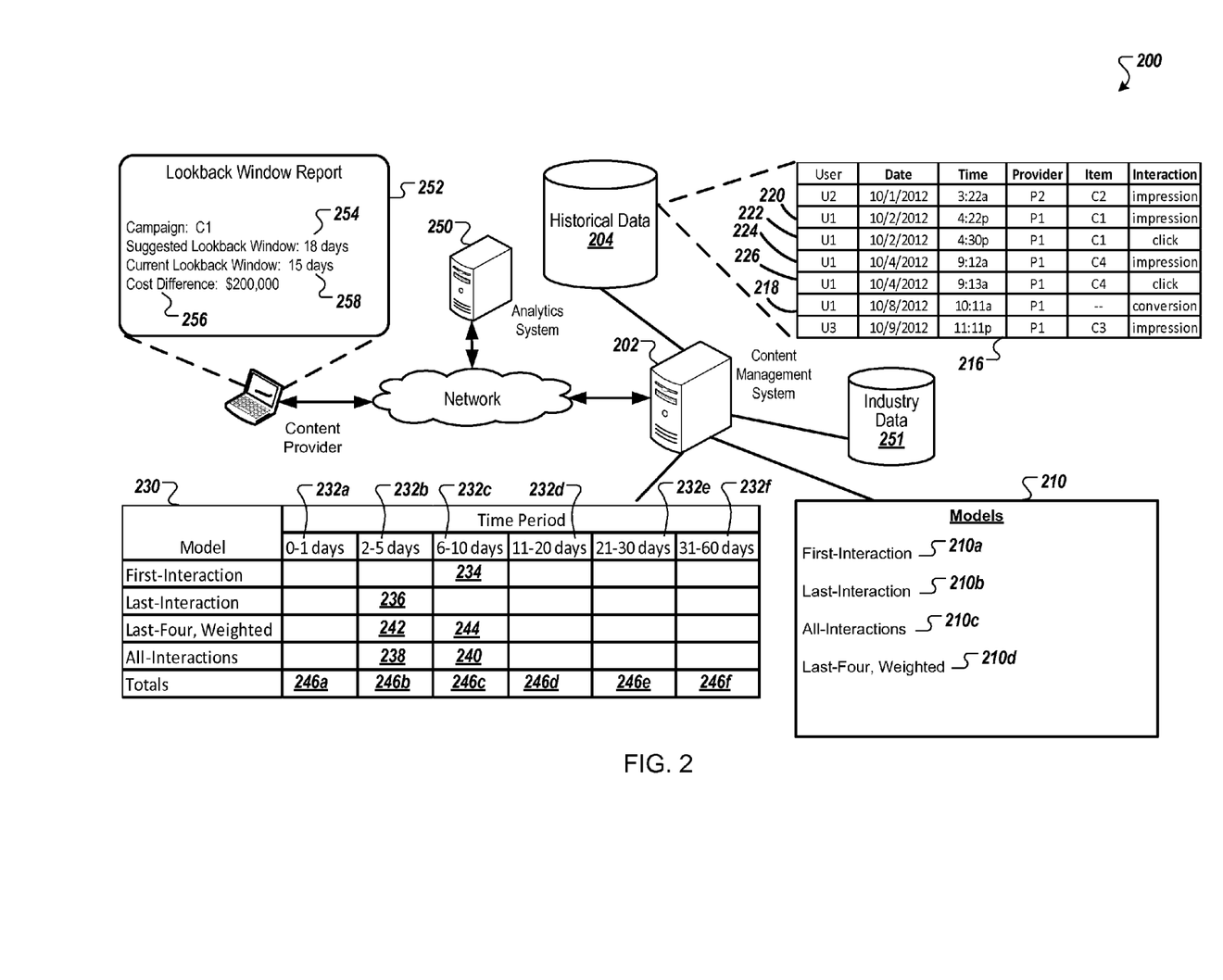
FIG. 2 is a block diagram of an example system for determining a suggested lookback window.

FIG. 2 is a block diagram of an example system 200 for determining a suggested lookback window. A content management system 202 can identify data for a content provider from a historical data store 204, in response to a request received for a report for a content provider, or as part of an automated process which automatically and periodically determines a lookback window for the content provider. The data identified from the historical data store 204 can include data related to presentation of content to users and data related to interactions of users with content presented by the content provider. The identified data can also include data related to events, such as conversion events. The identified data can be, for example, data for the content provider that corresponds to a specified time period. Other examples include the content provider specifying a particular country or other geographic area for which to identify data, or one or more channels or mediums (e.g., search, display channels) for which to identify data.

The content management system 202 can develop or identify one or more models for linking interactions with events. In some implementations, the content provider may have previously selected one or more models to be associated with one or more campaigns of the content provider. A model can include one or more criteria for use in evaluating an interaction to determine when an interaction should be linked to a given event. For example, a model can include one or more rules which define whether an interaction is attributed to a conversion, and for some models, one or more rules which assign a weight to attributed interactions. For example, the content management system 202 can identify a set of models 210 which include a first-interaction model 210a which includes criteria specifying that a first interaction in a time period is linked to a given event, a last-interaction model 210b which includes criteria specifying that a last interaction in a time period is linked to a given event, an all-interactions model 210c which includes criteria specifying that all interactions in a time period are linked to a given event, and a "last-four, weighted" model 210d which indicates that the four most recent interactions are linked to a given event, at specified weights. The "last-four, weighted" model 210d can, for example, specify that the four most recent interaction are to be weighted, in order of increasing age, using weights of, for example, 40%, 30%, 20%, and 10%, respectively.

The content management system 202 can evaluate each of the identified models 210a-d using the identified data from the historical data store 204. For example, the content management system 202 can evaluate, among other historical data, example historical data 216. The example historical data 216 includes, among other data, data for a content provider "P1". The example historical data 216 includes data 218 for a conversion event by a user "U1". The example historical data 216 indicates that, prior to the conversion event, the user "U1" performed several interactions related to a campaign of the content provider "P1". For example, data items 220-226 indicate that the user was presented a content item "C1", selected the content item "C1", was presented a content item "C4", and selected the content item "C4", respectively.

The content management system 202 can, for each event identified in the historical data 204, determine for each model a number of interactions that occurred in each of a set of time periods prior to a time of event for a given event. The time periods can be specified, for example, in terms of days, hours, or some other time value. A table 230 represents information that can be determined by the content management system 202. The table 230 includes information for time periods 232a-f having durations of 0-1 days, 2-5 days, 6-10 days, 11-20 days, 21-30 days, and 31-60 days, respectively. In some implementations, the time periods do not overlap. In other implementations, one or more of the time periods may overlap.

The content management system 202 can, when evaluating the first-interaction model 210a, determine that the interaction corresponding to the data 220 is to be linked to the conversion event corresponding to the data 218. The content management system 202 can determine that the time period 232c of 6-10 days is associated with the interaction corresponding to the data 220 by comparing a timestamp included in the data 220 to a timestamp included in the data 218. In response to such a determination, the content management system 202 can increment a counter associated with the first-interaction model 210a and with the time period 232c (e.g., a counter corresponding to a table cell 234).

Similarly, the content management system 202 can, when evaluating the last-interaction model 210b, determine that the interaction corresponding to the data 226 is to be linked to the conversion event corresponding to the data 218. The content management system 202 can determine that the time period 232b of 2-5 days is associated with the interaction corresponding to the data 226 by comparing a timestamp included in the data 226 to a timestamp included in the data 218. In response to such a determination, the content management system 202 can increment a counter associated with the last-interaction model 210b and with the time period 232b (e.g., a counter corresponding to a table cell 236).

As another example, the content management system 202 can, when evaluating the all-interactions model 210c, determine that the four interactions corresponding to the data 220, 222, 224, and 226, respectively, are to be linked to the conversion event corresponding to the data 218. The content management system 202 can determine that the time period 232c corresponds to the interactions corresponding to the data 220 and 222 and can determine that the time period 232b corresponds to the interactions corresponding to the data 224 and 226. The content management system can add two to a counter corresponding to the all-interactions model 210c and to the time period 232b (e.g., a counter corresponding to a table cell 238) and can add two to a counter corresponding to the all-interactions model 210c and to the time period 232c (e.g., a counter corresponding to a table cell 240).

As yet another example, the content management system 202 can, when evaluating the "last-four, weighted" model 210d, determine that the four interactions corresponding to the data 220, 222, 224, and 226, respectively, are to be linked to the conversion event corresponding to the data 218, but at a respective weight for each of the four interactions. For example, values of 0.4 and 0.3 can be added to a counter associated with the model 210d and with the time period 232b (e.g., a counter corresponding to a table cell 242), to apply weights for the interactions corresponding to the data 226 and 224, respectively. Similarly, values of 0.2 and 0.1 can be added to a counter associated with the model 210d and with the time period 232c (e.g., a counter corresponding to a table cell 244), to apply weights for the interactions corresponding to the data 222, and 220, respectively.

After processing the data identified in the historical data store 204, the content management system 202 can perform one or more mathematical operations on the determined number of interactions in each time period for each model and can produce a result for each model for each time period. For example, the content management system 202 can accumulate interactions associated with a respective time period to determine a total number of interactions associated with the time period, as illustrated by totals 246a-f that are respectively associated with the time periods 232a-f.

The content management system 202 can, for example, determine a time window for each of the models 210a-d. For example, the content management system 202 can determine which of the time windows 232a-f has the most associated interactions for each respective model 210a-d, or the content management system 202 can use another calculation to determine a time window for each model 210a-d.

The content management system 202 can determine one or more suggested times (e.g., lookback window(s)) for the content provider based on the result(s) of the performed mathematical operation(s) and on the time windows determined for each model 210a-d. For example, a single time can be suggested, a time can be suggested for each model 210a-d used in the evaluating, a time can be suggested for each model 210a-d that is associated with (e.g., used by) the content provider, a time can be suggested for each channel in a set of channels used by the content provider, or a time can be suggested for each of one or more campaigns that are associated with the content provider. A suggested time represents an amount of time before an event (e.g., a conversion) in which interactions are linked (e.g., attributed) to the event.

The content management system 202 can determine a suggested time by selecting a time window associated with a model from the models 210a-d that is slowest to converge. For example, suppose that time windows of 20 days, 2 days, 10 days, and 5 days have been determined for the models 210a-d, respectively. In this example, the content management system 202 can determine a selected time of 20 days. In some implementations, the content management system 202 can determine a suggested time by selecting a time window associated with a model that is fastest to converge (e.g., a time of window of 2 days in the above example). As another example, the content management system 202 can determine a suggested time as an aggregate of the suggested time windows of one or more models. For example, the content management system 202 can determine an average time window for the time windows associated with the models 210a-d (e.g., an average time window of 9.25 days, which can be rounded down to 9 days or rounded up to 10 days).

In some implementations, the content management system 202 can verify the suggested time(s) by comparing the suggested time(s) to data determined by an analytics system 250 and/or to data in an industry database 251. The content management system 202 can, for example, identify data in the industry database 251 that is associated with content providers that are similar to the content provider, such as information about typical conversion path lengths or typical lookback windows that are used by similar content providers. The content management system 202 can compare such information to the suggested time(s) to verify whether the suggested time(s) are reasonable/appropriate for the content provider.

In some implementations, the content management system 202 can automatically determine the suggested time(s) on a periodic basis and can store the determined suggested time(s). As part of a verification process, the content management system 202 can compare a current determined suggested time for a content provider to suggested times previously determined for the content provider, to determine whether a difference between the current time and, for example, an average previously-determined suggested time is more than a threshold. As part of the verification process, the content management system 202 can take into account predefined times, days, or date ranges which may be known to likely produce different results, such as "Black Friday", "Cyber Monday", the Christmas shopping season in general, Super Bowl Sunday, etc. Such analysis can take a country of the content provider into account (e.g., the content management system 202 can determine whether a particular time, day, date range, holiday, etc. applies to a given country).

In some implementations, the content management system 202 can adjust the suggested time based on, for example, cookie deletion data. The cookie deletion data can indicate an amount of time a cookie is likely to be valid. A user (or a browser) can automatically or manually delete cookies, for example. The content management system 202 can identify a predetermined average maximum cookie age, such as from a cookie deletion database or model. The content management system 202 can compare a suggested time (e.g., a time that is associated with a model that is slowest to converge) to the average maximum cookie age and can set the suggested time to be, for example, the average maximum cookie age if the suggested time is greater than the average maximum cookie age. The content management system 202 may reduce the suggested time in such an example to avoid a bias that may occur if a time longer than the average maximum cookie age is suggested. A bias can occur if a suggested time longer than the average maximum cookie age is used, since interaction data that is analyzed for potential linking to events may include a disproportionate amount of data from users who don't delete cookies, or who delete cookies infrequently.

In some implementations, the content management system 202 can identify a sensitivity to using a suggested time and can apply a correction factor to the suggested time based on the sensitivity. For example, a default sensitivity of 95% can be identified, which allows the system to adjust the suggested time by 5% (e.g., reduced by 5%). As another example, the content management system 202 can determine a mean suggested time from a set of determined suggested times (e.g., from a set of suggested times associated with the models 210a-d). The content management system 202 can add, for example, a standard deviation to the mean suggested time. In some implementations, when a resulting suggested time is greater than a determined average maximum cookie age, the content management system 202 can set the suggested time to the average maximum cookie age. In some implementations, a sensitivity to use can be identified from the industry database 251 or from some other data source.

In some implementations, the content management system 202 can automatically configure one or more campaigns for the content provider using the suggested time(s). The content management system 202 can also present the suggested time(s) to the content provider, such as on a report 252. The report 252 includes a suggested lookback window 254 of 18 days for a campaign "C1".

The report 252 can also include a cost value 256 of $200,000 which can be determined based on a comparison between the suggested lookback window 254 and a current lookback window 258. For example, the content management system 202 can identify that the current lookback window 258 that is associated with the content provider, can compare the current lookback window 258 to the suggested lookback window 254, and can determine the cost value 256, which represents an amount that is discounted based on the comparison. For example, suppose that using the current lookback window 258 of 15 days results in the linking of 75% of interactions for the content provider with a corresponding event. Suppose also that if the content provider alternatively used the suggested lookback window of 18 days that using such a lookback window would result in the linking of 90% of the interactions for the content provider with a corresponding event. The cost value 256 can be determined by determining a cost for the content provider of the additional 15% of interactions that can be determined to be associated with an event as a result of using the more appropriate (i.e., suggested) lookback window.

In some implementations, the report 252 can include information related to the verification of the suggested time(s). For example, if verification performed by the content management system 202 indicates that the suggested time(s) are sufficiently inconsistent with data from the analytics system 250 and/or the industry database 251, the report 252 can include one or more associated warnings and/or one or more controls which the content provider can use to accept or reject the use of the suggested time(s) in light of the warning information. In some implementations, the report 252 can include a graphical representation of one or more of the suggested lookback window 254, the current lookback window 258, the cost difference 256, and data that is from or based on data from the analytics system 250 or the industry database 251.

Figure 3:
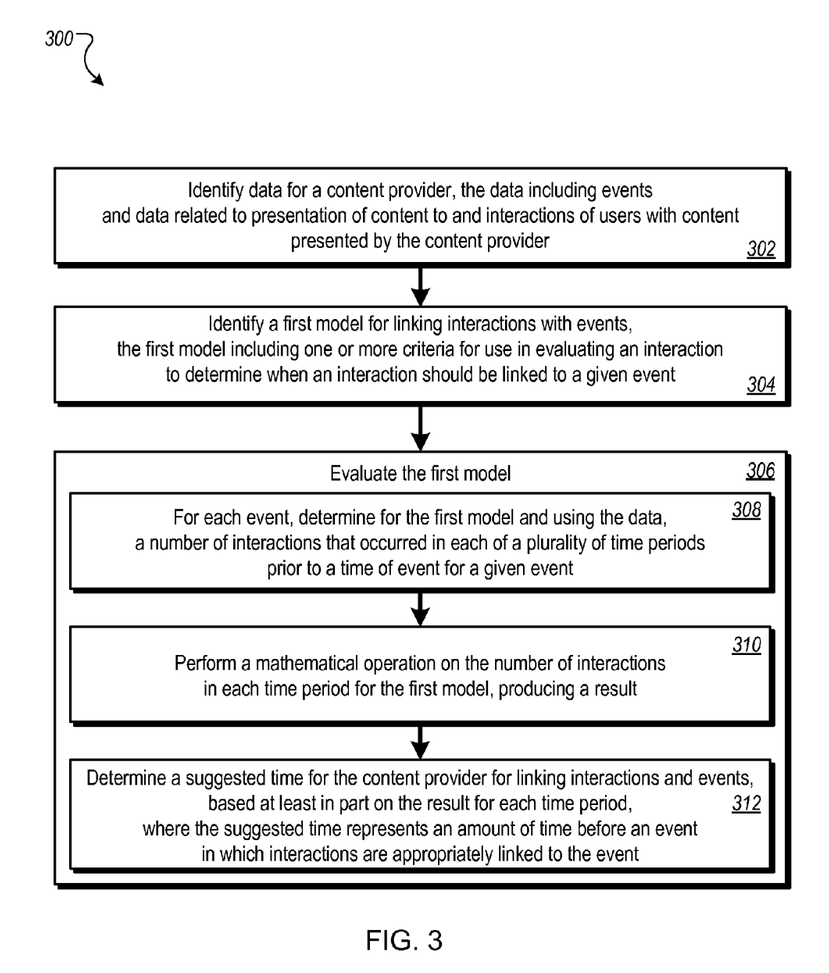
FIGS. 3 and 4 are flowcharts of example processes for determining a suggested lookback window.

FIG. 3 is a flowchart of an example process 300 for determining a suggested lookback window. The process 300 can be performed, for example, by the content management system 110 described above with respect to FIG. 1 or the content management system 202 described above with respect to FIG. 2.

Data for a content provider is identified (302), wherein the data includes data related to presentation of content and interactions of users with content presented by the content provider. The data can further include events. The data can be, for example, log data. The events can be, for example, conversion events. In some implementations, a sample of data for the content provider is identified. For example, a random sample of a certain percentage (e.g., ten percent) of data that is available for the content provider can be identified. In some implementations, data for a particular medium or channel (e.g., a search channel, a display channel) can be identified for the content provider. In some implementations, data for a particular country or other geographic area, a particular time period, or data matching some other filter can be identified for the content provider.

A first model for linking interactions with events is identified (304), wherein the first model includes one or more criteria for use in evaluating an interaction to determine when an interaction should be linked to a given event. The criteria can include criteria that define different types of sponsored content or different mediums for presentation of the sponsored content. The criteria can also include, for example, one or more rules which define which interactions are linked to an event, and for some models, weights that may be applied to some or all interactions. For example, the first model can be a first-interaction model where a first interaction in a time period is linked to a given event, a last-interaction model where a last interaction in a time period is linked to a given event, a weighted model where multiple interactions are linked to a given event with each interaction having a respective weight, or a model for which all interactions in a time period are linked to a given event with a same weight applied to each interaction. Other models are possible.

Linking can include, for example, for a given event, crediting an entity associated with an interaction that occurred in a suggested time prior to an occurrence of the given event. Linking can include, for example, attributing the interaction to the event. For example, in implementations where events are conversions and where the model is a first-interaction model, a first interaction (e.g., a first selection or click) of a content item in a time period before a conversion event can be attributed to the conversion event.

The first model is evaluated by one or more processors (306). The evaluating can include, for each event, determining for the first model and using the data, a number of interactions that occurred in each of a plurality of time periods prior to a time of event for a given event (308). The time periods can be non-overlapping. The time periods can include, for example, from zero to three days before the event, from four to ten days before the event, from eleven to twenty days before the event, from twenty one to thirty days before the event, and more than thirty days before the event. Other time periods and a different number of time periods can be used. Time periods can be defined in terms of days, hours, or some other time amount. Determining that a particular interaction occurred in a particular time period before the event can include comparing a timestamp associated with the event to a timestamp associated with the interaction.

The evaluating can include performing a mathematical operation on the number of interactions in each time period for the first model, producing a result (310). For example, the mathematical operation can be an accumulation and the result can be a total number in a respective time period.

The evaluating can include determining a suggested time (i.e., to be suggested to the content provider) for linking interactions and events based at least in part on the result for each time period (312), where the suggested time represents an amount of time before an event in which interactions are appropriately linked to the event. The suggested time can define a time window (e.g., a lookback window) for linking interactions with (e.g., attributing interactions to) events. When the criteria includes criteria that define different types of sponsored content or different mediums for presentation of the sponsored content, the suggested time can be attributable to such criteria.

Figure 4:
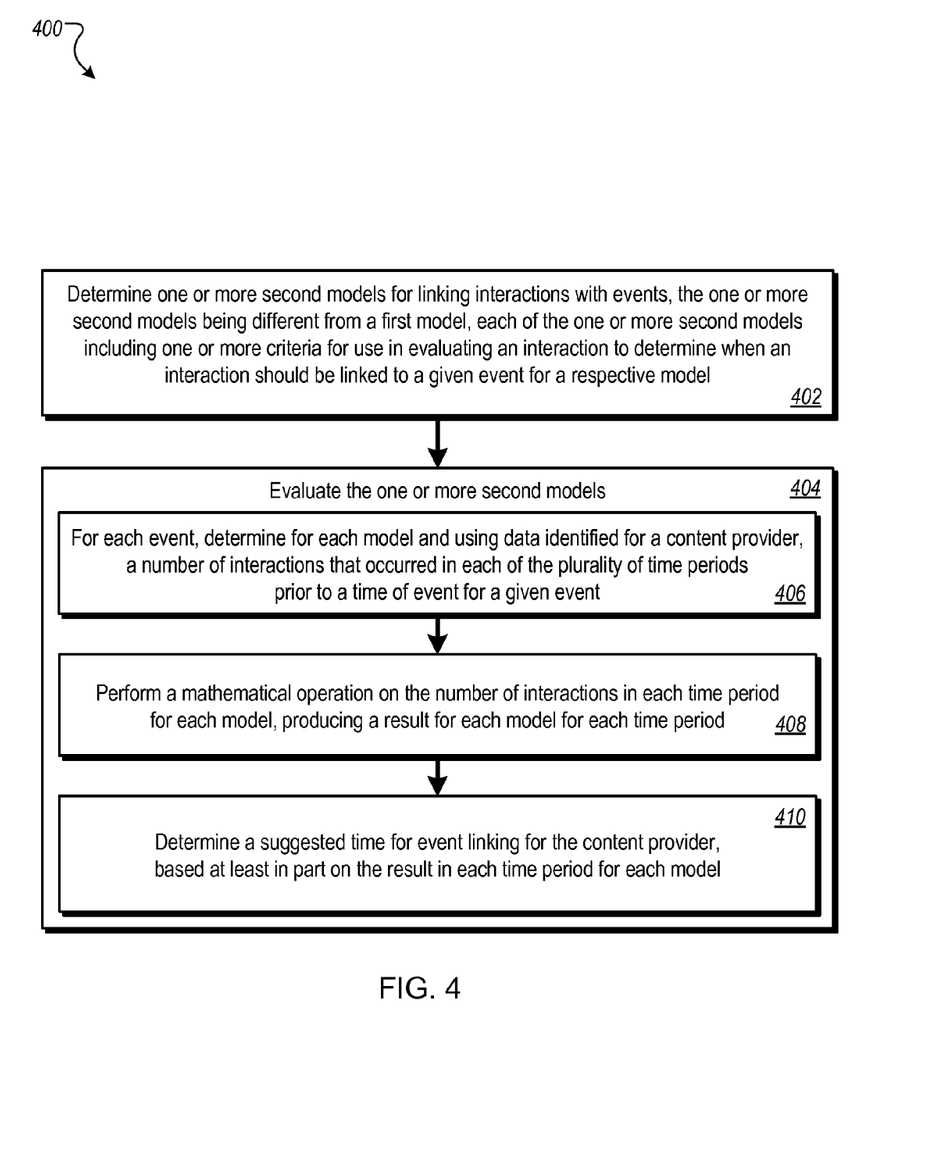

FIG. 4 is a flowchart of an example process 400 for determining a suggested lookback window. The process 400 can be performed, for example, by the content management system 110 described above with respect to FIG. 1 or the content management system 202 described above with respect to FIG. 2.

One or more second models for linking interactions with events are determined (402), wherein the one or more second models are different from a first model (e.g., the first model described above with respect to FIG. 3). Each of the one or more second models includes one or more criteria for use in evaluating an interaction to determine when an interaction should be linked to a given event for a respective model. The first model can be, for example, a first-interaction model where a first interaction in a time period is linked to a given event and the one or more second models can include one or more of a last-interaction model where a last interaction in a time period is linked to a given event, a weighted model where multiple interactions are linked to a given event but each at a respective weight, and a model for which all interactions in a time period are linked to a given event with each interaction weighted (e.g., equally).

The one or more second models are evaluated by one or more processors (404). The evaluating can include, for each event, determining for each model and using data identified for a content provider, a number of interactions that occurred in each of the plurality of time periods prior to a time of event for a given event (406). The data identified for the content provider can be as described above for step 302 of the process 300.

The evaluating can include performing a mathematical operation on the number of interactions in each time period for each model, producing a result for each model for each time period (408). For example, the mathematical operation can be an accumulation and the result can be a total number in a respective time period.

The evaluating can include determining a suggested time for event linking for the content provider based at least in part on the result in each time period for each model (410). Determining the suggested time can include picking a time window associated with one model of the first and the one or more second models. For example, a time window associated with the first model or the one or more second models that is a slowest model to converge can be selected. As another example, a time window associated with the first or one of the second models that is the fastest to converge can be selected. As yet another example, a time window that is a median time window from among time windows associated with the first and the one or more second models can be selected. In some implementations, a suggested time window can be selected that is an aggregate of the suggested time windows for at least two models of the first and the one or more second models. In some implementations, when aggregating suggested time windows, one or more outlier time windows can be excluded from the aggregating. For example, a slowest to converge and a fastest to converge can be excluded. As another example, time windows that are above a first threshold or below a second threshold can be excluded based on an assumption that such time windows are not reasonable.

Figure 5:
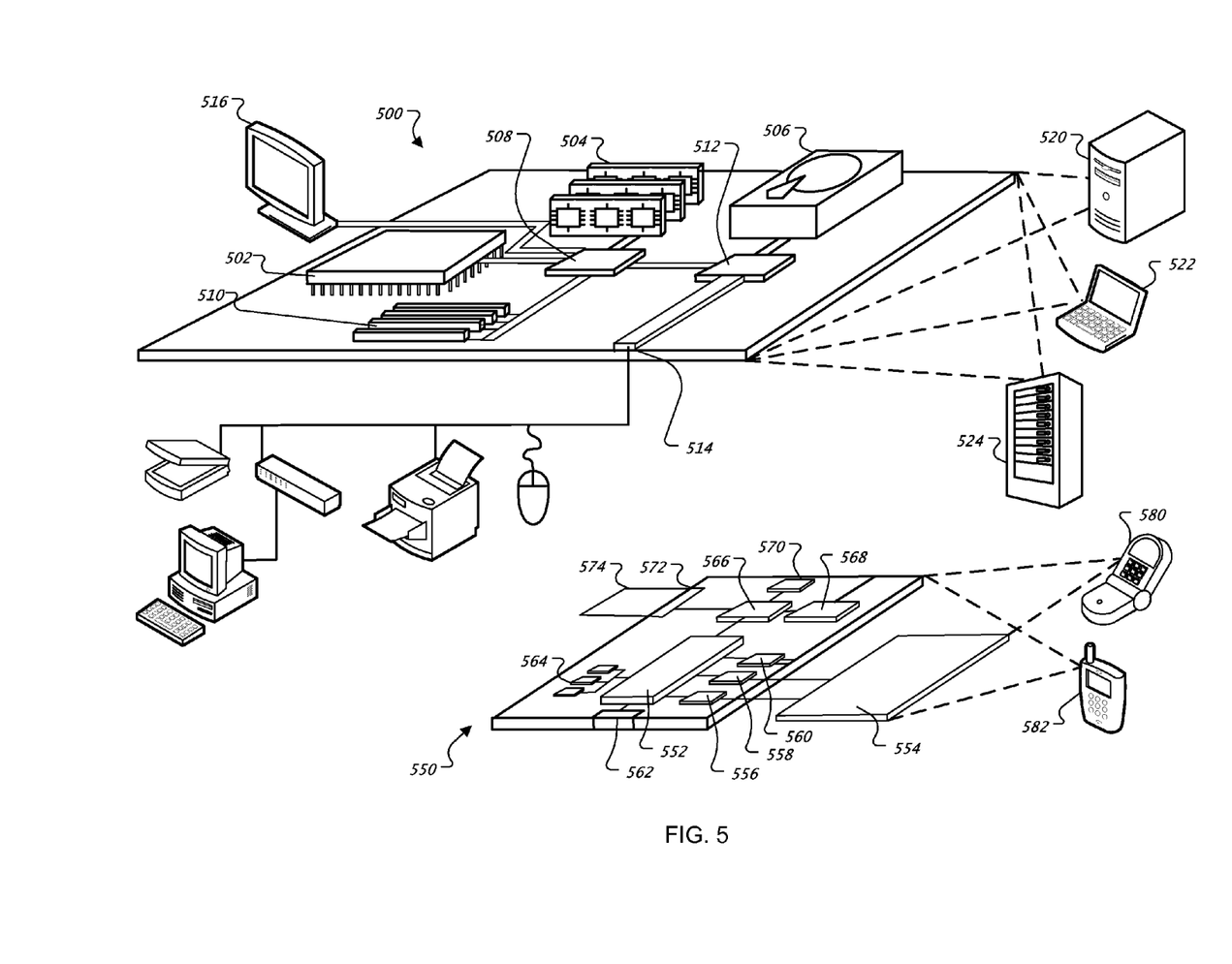
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising
logging, based on cookie information, interactions associated with a content provider, wherein the interactions represent interactions of users with content presented by the content provider;
logging a plurality of conversion events associated with products or services that are represented in the presentations of content;
evaluating, by one or more processors, logged conversion and interaction data including:
for each given conversion event in the plurality of logged conversion events:
identifying one or more interactions that are linked to the given conversion event;
determining, based on a comparison of a first timestamp for each identified interaction and a second timestamp of the conversion event, a time window before the given conversion event that is associated with each identified interaction; and
for each identified interaction, incrementing an interaction count associated with the time window associated with the interaction; and
determining one or more suggested time windows for the content provider for linking interactions and conversion events based on the interaction counts for each time window, wherein a suggested time window represents an amount of time before a conversion in which interactions are appropriately linked to the conversion;
determining that a given suggested time window of the one or more time windows exceeds an average cookie age of cookies from which the cookie information was received;
reducing the given suggested time window based on the determination that the given suggested time window exceeds the average cookie age;
providing, through a user interface presented to the content provider, a presentation of the given suggested time window and others of the suggested one or more time windows;
receiving, through the user interface, an acceptance of a suggested time window to be used; and
using the accepted time window to determine attribution credit to be applied to specific interactions that are correlated to specific conversion events.

2. The method of claim 1 wherein determining a suggested time includes selecting a suggested time window as an aggregate of multiple possible time windows.

3. The method of claim 1 wherein determining a suggested time includes selecting a time window from among multiple possible time windows that is slowest to converge.

4. The method of claim 1 further comprising identifying a sensitivity to using the suggested time, and applying a correction factor to the suggested time based at least in part on the sensitivity.

5. The method of claim 1 further comprising adjusting the suggested time based at least in part on cookie deletion data, wherein the cookie deletion data indicates an amount of time a cookie is likely to be valid, and wherein cookies are used to assist in accumulating the events and interactions.

6. The method of claim 1 wherein the criteria include criteria that define different types of sponsored content or different mediums for presentation of the sponsored content and where the suggested time is attributable to the given criteria.

7. The method of claim 1 further comprising:
identifying a current lookback window associated with the content provider,
comparing the current lookback window to the suggested time including
providing a comparison of a number of interactions or dollar amount that is discounted based on the comparison; and
providing a summary of the comparison to the content provider.

8. The method of claim 1 wherein linking includes attributing the interaction to the event.

9. The method of claim 1 wherein the time windows are non-overlapping.

10. The method of claim 1 wherein the suggested time defines a time window for linking interactions with events.

11. The method of claim 1 wherein linking includes, for a given event, crediting an entity associated with an interaction that occurred in a suggested time prior to an occurrence of the given event.

12. A non-transitory computer program product tangibly embodied in a computer-readable storage device and comprising instructions that, when executed by a processor, cause the processor to:
log, based on cookie information, interactions associated with a content provider, wherein the interactions represent interactions of users with content presented by the content provider;
log a plurality of conversion events associated with products or services that are represented in the presentations of content;
evaluate, by one or more processors, logged conversion and interaction data including:
for each given conversion event in the plurality of logged conversion events:
identify one or more interactions that are linked to the given conversion event;
determine, based on a comparison of a first timestamp for each identified interaction and a second timestamp of the conversion event, a time window before the given conversion event that is associated with each identified interaction; and
for each identified interaction, increment an interaction count associated with the time window associated with the interaction; and
determine one or more suggested time windows for the content provider for linking interactions and conversion events based on the interaction counts for each time window, wherein a suggested time window represents an amount of time before a conversion in which interactions are appropriately linked to the conversion;
determine that a given suggested time window of the one or more time windows exceeds an average cookie age of cookies from which the cookie information was received;
reduce the given suggested time window based on the determination that the given suggested time window exceeds the average cookie age;
provide, through a user interface presented to the content provider, a presentation of the given suggested time window and others of the suggested one or more time windows;
receive, through the user interface, an acceptance of a suggested time window to be used; and
use the accepted time window to determine attribution credit to be applied to specific interactions that are correlated to specific conversion events.

13. A system comprising:
a content management system;
an interaction data store;
wherein the content management system is configured to:
log, in the interaction data store and based on cookie information, interactions associated with a content provider, wherein the interactions represent interactions of users with content presented by the content provider;
log, in the interaction data store, a plurality of conversion events associated with products or services that are represented in the presentations of content;
evaluate, by one or more processors, logged conversion and interaction data including:
for each given conversion event in the plurality of logged conversion events:
identify one or more interactions that are linked to the given conversion event;
determine, based on a comparison of a first timestamp for each identified interaction and a second timestamp of the conversion event, a time window before the given conversion event that is associated with each identified interaction; and
for each identified interaction, increment an interaction count associated with the time window associated with the interaction; and
determine one or more suggested time windows for the content provider for linking interactions and conversion events based on the interaction counts for each time window, wherein a suggested time window represents an amount of time before a conversion in which interactions are appropriately linked to the conversion;
determine that a given suggested time window of the one or more time windows exceeds an average cookie age of cookies from which the cookie information was received;
reduce the given suggested time window based on the determination that the given suggested time window exceeds the average cookie age;
provide, through a user interface presented to the content provider, a presentation of the given suggested time window and others of the suggested one or more time windows;
receive, through the user interface, an acceptance of a suggested time window to be used; and
use the accepted time window to determine attribution credit to be applied to specific interactions that are correlated to specific conversion events.

* * * * *